Patented June 13, 1939

2,161,826

UNITED STATES PATENT OFFICE 2,161,826

ALKYL PHENOL AND METHOD OF MANUFACTURING SAME

Lucas P. Kyrides, Webster Groves, Mo., assignor to Monsanto Chemical Company, St. Louis, Mo., a corporation of Delaware No Drawing. Application May 28, 1934,
Serial No. 727,881

9 Claims. (Cl. 260—624)

This invention relates to the manufacture of alkyl phenols, including the substitution products thereof such as the alkyl chlorphenols, and the like, and it relates more specifically to the manufacture of such alkyl phenols wherein an olefine or an alkyl halide embodying a secondary or tertiary carbon atom is employed.

Various methods have been proposed heretofore for the alkylation of phenols and their substitution products, including chlorphenols, etc. One such method involves the reaction of a phenol with an olefine in a mixture of acetic and sulphuric acids or sulphuric acid alone. Another method involves the reaction of a phenol with an alcohol in the presence of a catalyst such as zinc chloride, aluminum chloride and the like. It has also been proposed to manufacture alkyl phenols by causing phenol to react in the presence of zinc chloride, aluminum chloride, ferric chloride and the like, with a tertiary chloride, such as tertiary butyl chloride, tertiary amyl chloride and the like.

These methods share certain disadvantages. Thus, the catalyst must be removed from the reaction mixture. In some instances, and particularly when sulphuric acid is employed, by-product formation of a sulfonic acid genus is inevitable. Moreover, the alcohol or olefine is decomposed or polymerized in part and consequently lost. Finally, isomeric ethers are obtained which interfere with the purification of the product as well as impair the yield of the desired material.

The present invention has as one of its objects the obviation of the foregoing disadvantages in that it avoids the necessity of catalytic substances such as have been proposed heretofore, and enables one to obtain directly and in good yields the desired alkyl phenol without appreciable or objectionable aromatic by-product formation.

The invention likewise contemplates a class of alkyl phenols characterized by their inordinate bactericidal power; suitability for the manufacture of oil soluble resins of the phenolaldehyde type; and in the form of their sulfonic acid salts, their value as detergents.

I have found that tertiary alkyl halides react directly and in the absence of catalysts with phenols to form alkyl phenols with substantially no aromatic by-product formation. I have likewise found that this reaction proceeds even at ordinary or moderately elevated temperatures, hydrogen halide being evolved. I have likewise found that in the absence of catalysts the proportion of ortho and para alkyl phenol isomers may be varied to an extent and in a manner not known heretofore. Thus, at comparatively low temperatures the formation of the ortho isomer is appreciable whereas at progressively increasing temperatures the amount of ortho isomer produced is reduced correspondingly.

*Example 1.*—800 grams of phenol are agitated vigorously while maintaining a temperature of approximately 125° C. over a period of 10 hours, during which 225 grams of tertiary butyl chloride are introduced, preferably through a porous alundum thimble which is immersed in the hot phenol. After all of the tertiary butyl chloride has thus been added the mixture is agitated for an additional short time at approximately the same or slightly elevated temperatures. Hydrogen chloride is permitted to escape through a reflux condenser. If desired, the hydrogen chloride thus recovered may be absorbed in tertiary butyl alcohol whereby the corresponding chloride is formed. In this manner it is possible to utilize the hydrogen chloride repeatedly.

The phenolic reaction mixture is fractionated at 20 mm. pressure, the first cut consisting largely of phenol, and boils at approximately 80° C. After the temperature reaches 100° C. or slightly higher, approximately 48 grams of a fraction boiling up to 118° C. is recovered which consists of ortho tertiary butyl phenol containing an appreciable amount of the para isomer. A fraction is then obtained, amounting to 307 grams, boiling at 120° C.–126° C., which has a crystallizing point of 97° C. and consists of almost pure para tertiary butyl phenol. The melting point of the pure product is given in the literature as 99° C. The residue is of negligible proportion. The yield on phenol is practically theoretical. The yield of the combined ortho and para fractions on butyl chloride is about 97%. By following this procedure one obtains approximately 13% of the ortho isomer and 87% of the para isomer. By reducing the temperature of the reaction, proportionately more ortho tertiary butyl phenol is obtained. The reaction proceeds slowly at a temperature even as low as 40° C. Conversely, by effecting the reaction at a higher temperature less ortho isomer is obtained as evidenced by the following example:

*Example 2.*—250 grams of tertiary butyl chloride are added over a period of ten hours to 800 grams of phenol which is agitated vigorously at 160° C.–170° C. The procedure is in other respects similar to that set forth in Example 1. Upon fractionating the mixture one obtains approximately 8% of the ortho isomer and 92% of the para isomer. The reaction can be run in shorter time if proper distribution of the butyl chloride can be effected during the addition, as the reaction appears to be instantaneous.

Example 3.—Octyl phenols may be made from their corresponding tertiary octyl chlorides in a manner analogous to that described in Examples 1 and 2. For this purpose the octyl chloride may be made conveniently by combining an octylene with concentrated hydrochloric acid whereupon HCl adds directly to the octylene to form the octyl chloride. The chloride is isolated conveniently by dehydrating over CaCl₂ and distilling in vacuo. As an example of the foregoing, 600 cc. of concentrated hydrochloric acid, which has been saturated with hydrogen chloride at a temperature of 0° C.–5° C. is agitated for 10–12 hours with 280 grams of di-isobutylene. The aqueous layer is then separated from the upper non-aqueous layer which consists largely of the octyl chloride. This non-aqueous layer is washed with water and then dilute bicarbonate of soda solution, after which it is dried over calcium chloride and fractionated in vacuo. 300 grams of di-isobutyl chloride, boiling at 37° C.–39° C. at 15–18 mm. are obtained.

Example 4.—45 grams of chlor resorcinol are agitated at 100° C. to which 25 grams of di-isobutyl chloride are added at intervals over a period of one hour. Hydrogen chloride is evolved. The resulting product is washed with water whereupon an insoluble oil is obtained. The oil fraction is extracted with isopropyl ether and the ether in turn is washed four times with fresh water. The resulting ether solution is fractionated and the alkyl chlor resorcinol fraction, boiling at 190° C.–210° C. at 12 mm., is recovered separately.

Example 5.—150 grams of resorcinol are dissolved in 50 grams of methanol to which 40 grams of di-isobutyl chloride is added dropwise over a period of 5 hours while agitating the mixture at 85° C.–90° C. The resulting mixture is agitated while maintaining the reaction temperature for 10 to 14 hours, after which it is fractionated. The first high boiling cut, consisting of resorcinol, is thereby separated from the reaction mixture. The next cut, most of which boils at 185° C.–195° C. at 12 mm. and which consists of a thick oil, is recovered separately and crystallized from petroleum ether. The product is dried at 60° C. and melts at 107.5° C.

Example 6.—Substitute 260 grams of tertiary amyl chloride for the butyl chloride in Example 1. Tertiary amyl phenol is obtained in good yields.

In the foregoing examples the tertiary alkyl chloride has been employed. However, one may substitute therefore the corresponding bromide. The hydrogen bromide which forms may be recovered conveniently by dissolving in water or in the tertiary alkyl alcohol which combines therewith to form the corresponding tertiary alkyl bromide. In lieu of the phenol or resorcinol employed in the foregoing examples, one may substitute pyrocatechol, guaiacol, chlorphenols, cresols, naphthol, phenyl phenol, benzyl phenol, and the like, to form the corresponding alkyl or poly alkyl derivatives. Alternatively, if the halogenated derivative is desired one may first form the alkyl phenol and subsequently halogenate the alkyl phenol as is well understood by those skilled in the art.

It is likewise possible to form the di-substituted alkyl phenols by reacting 2 mols of the alkyl halide with one mol of the phenol or by reacting one mol of the alkyl halide with one mol of the mono substituted alkyl phenol. In this way one can prepare di or poly substituted alkyl phenols in which the several alkyl groups differ from each other, by appropriate selection of the alkyl halide employed in each step.

Example 7.—605 grams of para tertiary butyl phenol (crystallizing point 93° C.–94° C.) are maintained at 150° C. while adding 300 grams of tertiary butyl chloride, as in Example 1, over a period of 14 hours. The increase in weight is 107 grams which corresponds to 174 grams of reacted chloride. Some decomposition of the tertiary butyl chloride into butylene and hydrogen chloride occurs which, upon condensation, combine again to form the tertiary alkyl chloride. The reaction mixture is fractionated whereupon there is collected 343 grams of the mono tertiary butyl phenol boiling at 120° C.–130° C. at 18 mm. The undistilled fraction is then distilled and upon careful redistillation there is obtained 264 grams of a liquid which is presumably di-tertiary butyl phenol, boiling constantly at 132° C. at 16 mm. The material is a thick oil which crystallizes by seeding or after long standing.

I have also found that olefines embodying the following carbon linkage:

combine directly with phenols in the presence of a small amount of hydrogen halide to form the corresponding alkyl phenol without the formation of aromatic by-products, the hydrogen halide, apparently, acting as the catalyst. The foregoing carbon linkage is one which is characteristic of an olefine which, upon the addition of hydrogen chloride, forms readily an alkyl halide that may be hydrolyzed readily with water to form a tertiary alcohol, or, stated otherwise, the linkage is one embodying a tertiary carbon atom having an olefine linkage, and I designate this linkage in the present specification as a "tertiary olefinic linkage."

Example 8.—727 grams of dry or substantially dry phenol, such as is obtained by fractional distillation, are saturated at 80° C.–85° C. with dry hydrogen chloride. For this purpose very little hydrogen chloride is necessary. Subsequently 100 grams of di-isobutylene, which may be obtained conveniently by condensing 2 mols of isobutylene and which may be represented structurally as follows:

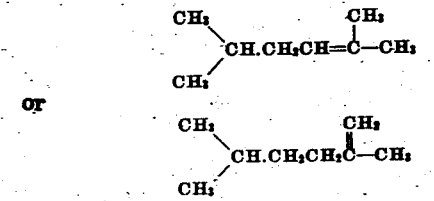

depending upon the isomeric form, are added while maintaining the previous temperature and agitated condition. From time to time a small amount of hydrogen chloride is introduced into the reaction mixture to assure saturation. After about 18 hours the product is fractionated. 170 grams of di-isobutyl phenol, boiling at approximately 157° C. at 18 mm., is obtained, practically no residue or by-products being formed. The product crystallizes at 82.5° C. which compares favorably with that recorded in the literature, 83° C. (J. A. C. S. 1923, page 2574) and obtained by other methods. On crystallization from petroleum ether a product melting at 86° C. is obtained. The yield is equivalent to approximately 90% of theory based on the di-isobutylene and is practically quantitative based on the phenol consumed.

In lieu of di-isobutylene one may employ homologues of di-isobutylene having tertiary olefinic linkage. Di-isobutylene is made by condensing two mols of isobutylene. Tri-isobutylene, which may likewise be employed is made by condensing three mols of isobutylene.

*Example 9.*—Substitute a mol equivalent of tri-isobutylene for the di-isobutylene provided in Example 8 and otherwise proceed as described in said Example 8.

*Example 10.*—Substitute 88 grams of tetramethyl ethylene

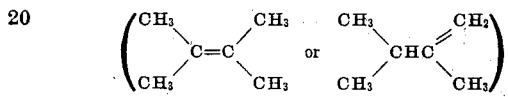

for the di-isobutylene provided in Example 8 and otherwise proceed as described in said Example 8.

*Example 11.*—In lieu of the hydrogen chloride provided in Example 8 substitute hydrogen bromide, zinc chloride or aluminum chloride or mixtures thereof in small amounts, preferably less than 1% based on the weight of the phenol, or, alternatively, add a small amount of the hydrogen halide in the form of the corresponding alkyl halide. Thus, in lieu of gaseous hydrogen halide, one may add, either during the initial stages of the reaction or preferably progressively during the course of the reaction, a small amount of the tertiary alkyl chloride corresponding to the olefine and which may be obtained by reacting the olefine with concentrated hydrochloric acid as previously described in connection with Example 3.

*Example 12.*—165 grams of resorcinol are dissolved in a sufficient quantity of a mixture of ethyl and isopropyl ethers, the ethers being present in approximately equal parts by weight, to form a true solution at about 70° C. The resulting solution is agitated at 70° C.–75° C. and treated with a mixture of 50 grams of di-isobutylene and 5 grams of di-isobutyl chloride. The reaction is permitted to proceed for 10–14 hours, after which the reacted mixture is treated with sufficient water and benzol to dissolve resorcinol and di-isobutyl resorcinol, respectively. The aqueous resorcinol layer is drawn off and the benzene layer extracted three times with water to insure complete removal of the unreacted resorcinol. If desired, the resulting combined aqueous fractions may be extracted with benzol to remove any alkyl resorcinols which may be contained therein. 78.5 grams of an oil boiling at 195° C.–202° C. at 17 mm., which solidifies upon cooling, is obtained. By crystallization one obtains a product which melts at 110° C. This melting point, which is 8° higher than that reported in the literature, indicates that the product represented by the lower melting point was not very pure. The octyl resorcinol on chlorination has a very high phenol coefficient on *Staphylococcus aureus*.

Examples 8, 9, 10, 11 and 12 are representative embodiments of my invention based on my discovery that olefines having a tertiary olefinic linkage combine directly in good yields and without by-product formation to form the corresponding alkyl phenol.

My investigation has further disclosed that the di or poly iso-alkyl olefines such, for example, as di-isobutylene or their hydrogen halide addition products, react at high temperatures with phenol to form, not the corresponding di or poly alkyl phenol as might be expected, but the corresponding mono tertiary alkyl phenol such as tertiary butyl phenol.

Some of these di and poly iso-alkyl olefines are obtained conveniently by condensing olefines, such as isobutylene, to form poly iso-alkyl olefines such as di-isobutylene, tri-isobutylene, etc. These materials and their corresponding alkyl halides react at elevated temperatures partly as the depolymerized alkyl halide which apparently combines with the phenol to form the corresponding alkyl phenol.

Di-isobutyl chloride, the preparation of which has been described heretofore (see Example 3), is added slowly to the phenol which is maintained at the boiling temperature. In addition to di-isobutyl phenol, considerable tertiary butyl phenol is formed.

1500 grams of phenol are agitated while maintaining a temperature of 160° C.–165° C. while adding dropwise 374 grams of di-isobutyl chloride. The reaction is permitted to proceed over a period of 4–8 hours. Upon fractionation one obtains first the unreacted phenol, followed by 375 grams of a fraction boiling at approximately 118° C. at 18 mm. which has a crystallizing point of 97° C. Upon crystallization from petroleum ether the product will be found to melt at 99° C. and is otherwise the same as that obtained when tertiary butyl chloride is caused to react with phenol. The fraction boiling at approximately 160° C.–163° C. at 18 mm. and amounting to 208 grams consists principally of di-isobutyl (octyl) phenol.

I have also found that instead of reacting an olefine having a tertiary olefinic linkage with phenol in the presence of a trace of hydrogen halide or an acid reaction salt, such as zinc chloride, one may employ an alkyl halide which, upon splitting HCl, forms a tertiary olefinic linkage. For this purpose the halogen may be joined to the tertiary carbon atom or to the carbon atom immediately adjacent thereto and forming a part of the tertiary linkage. In the latter case the halogen may be joined to a primary or secondary carbon.

An example of a compound in which the halogen is joined to a primary carbon is ethyl hexyl chloride having the configuration:

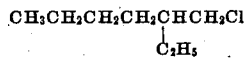

It is to be noted that the primary carbon atom to which the halogen is joined is connected directly to a tertiary carbon atom.

An example of an alkyl halide in which the halogen is attached to a secondary carbon is 3-chlor-2-methyl butane, having the following structural configuration:

Here, it is to be noted that the secondary carbon atom to which the halogen is joined is connected directly to a tertiary combination.

Primary, as well as secondary, alkyl halides and particularly those wherein the carbon atom to which the halogen is linked to a tertiary carbon atom, react directly with phenols to form the corresponding alkyl phenols.

*Example 13.*—Octyl chlorides having the following configuration may be made conveniently by adding slowly 611 grams of ethylhexyl alcohol

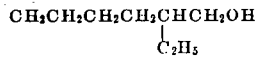

to 670 grams of thionyl chloride while maintaining a temperature of approximately 70° C. After all of the thionyl chloride has been added, the temperature is raised to 120° C. and maintained for several hours. The reaction product is cooled and treated with water and the water layer drawn off. The non-aqueous fraction is washed and fractionated whereby one obtains 627 grams of the chloride which boils at 52° C. at 10 mm. In general, primary alkyl chlorides, of which the foregoing is an example, and to a less extent secondary alkyl chlorides, are more stable than tertiary chlorides, although the formation of their corresponding alkyl phenol is possible by operating at a somewhat higher temperature. For instance, the above octyl chloride does not react with a parachlorphenol with any speed below 100° C.

Example 14.—520 grams of parachlorphenol and 250 grams of octyl chloride, made as described in Example 13, are heated at 160° C.–170° C. for nearly 40 hours or until evolution of hydrogen chloride subsides. The resulting product is fractionated carefully at first under partial vacuum to remove the parachlorphenol, and later at the highest degree of vacuum conveniently obtainable. The fraction distilling above the parachlorphenol range is refractionated and one thus obtains about 130 grams of an octyl parachlorphenol distilling at about 165° C. at 14 mm. This product has an inordinately high phenol coefficient on *Staphylococcus aureus* of over 2000.

During the reaction a part of the octyl chloride is decomposed into hydrogen chloride and octylene. This hydrocarbon is collected and when fractionated will be found to boil at 119° C.–122° C. The amount thus recovered is approximately 74 grams. It probably has the following structural configuration:

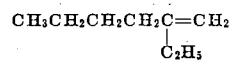

or an isomeric form thereof.

Example 15.—Under some conditions, as when a primary or secondary alkyl halide is caused to react in accordance with the principles of my invention, one obtains incomplete conversion of the halide to the alkyl phenol. A portion of the alkyl halide splits to form hydrogen halide and olefine. I have found, however, that this olefine may be recovered and combined with a hydrogen halide to form the corresponding alkyl halide and that the resulting alkyl halide may be combined with a phenol, as in the case of other alkyl halides, to form an alkyl phenol, but in this case it will be found that the alkyl halide is more reactive, that is, it combines wtih the phenol at a much lower temperature than the original alkyl halide from which the olefine was formed. This difference in reactivity appears to be attributable to a rearrangement, the precise nature of which has not been investigated, but by analogy it is assumed that the halogen must be attached to a tertiary carbon.

By agitating the hydrocarbon of Example 14 with 250 cc. of fuming muriatic acid at 5° C., the alkyl chloride is formed, which is washed with water, dried over calcum chloride, and fractionated at full vacuum. In this manner one obtains an octyl chloride which boils at 55° C. at about 15 mm. and which probably has the following structural configuration:

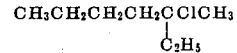

Example 16.—300 grams of phenol and 65 grams of tertiary octyl chloride, made as described in Example 15, are heated at 80° C. under reflux conditions. Hydrogen chloride is evolved for about 5 hours, after heating for a short time longer the material is separated into its constituents by fractionation. In addition to unreacted phenol one obtains 82 grams of an octyl phenol which boils at 151° C.–152° C. at 10–12 mm. The yield, on phenol is practically theoretical, on octyl chloride is 91%.

Example 17.—Octyl parachlorphenol may be made from parachlorphenol and the alkyl chloride of Example 13 at temperatures below 100° C. The reaction may be facilitated by adding a small amount of an anhydrous metallic salt, which, due to hydrolysis, gives an acid reaction when dissolved in water, particularly aluminum chloride, zinc chloride and the like. Thus, 151 grams of parachlorphenol and 70 grams of the octyl chloride of Example 13 are mixed at about 40° C. after which 10 grams of aluminum chloride are added. Hydrogen chloride is evolved. The mixture is agitated at 90° C. for about 48 hours before washing with water and dilute muriatic acid. The washed oily product is fractionated at 10–12 mm. and the fraction boiling at 165° C.–170° C. and amounting to 50 grams is collected. It consists essentially of octyl parachlorphenol.

Example 18.—200 grams of resorcinol and 150 cc. of ethylene dichloride are heated with agitation to 90° C. 50 cc. of isopropyl ether are then added to effect complete solution. Subsequently 60 grams of octyl chloride, such as is obtained in Example 15, are added and the reaction is allowed to proceed while maintaining the temperature at approximately 90° C. for 20 hours. The reaction mixture is then fractionated. The resorcinol distilled at 152° C.–155° C. at 12 mm. followed by the octyl resorcinol which boils at approximately 192° C. at 12 mm. The fraction boiling between 188° C.–193° C. is refractionated and then crystallized from petroleum ether, the crystalline material melting at 89.5° C.

Example 19.—262 grams of phenol and 50 grams of cyclohexyl chloride are heated under reflux at 140° C.–145° C. for 12–14 hours. Considerable cyclohexyl chloride decomposes simultaneously to cyclohexene and HCl which can be isolated during the reaction. The reacted mixture is fractionated and a cut boiling at 148° C. at 14 mm. is isolated and crystallized from benzene and petroleum ether. The product, para cyclohexyl phenol, melts at 130° C. In like manner other cyclohexyl phenols or methyl cyclohexyl phenols may be formed.

Under some conditions it is advantageous to convert a tertiary alcohol into its chloride by simply agitating with fuming muriatic acid. This is particularly true when the olefine is relatively volatile. On the other hand, under other conditions it is preferable to form the olefine by any of the well known methods, and convert the olefine into the chloride, or, alternatively, combine the olefine directly with the phenol in the presence of hydrogen chloride or the like as described heretofore. One method of obtaining olefines in relatively pure form is to pass the alcohol over a dehydrating catalyst, such as aluminum oxide and the like. Thus, for example, octylene may be obtained by passing beta-ethylhexyl alcohol over Al₂O₃ whereupon water is split from the alcohol and the olefine is formed. The resulting olefine is then combined with hydrogen chloride in the form of fuming muriatic acid as previously described.

*Example 20.*—250 grams of parachlorphenol and 60 grams of octyl chloride, formed as described in the preceding paragraph, are heated under reflux for 24 hours at 135° C. Upon fractionation there is obtained 51 grams of octyl parachlorphenol, boiling at approximately 170° C. at 12 mm.

In the foregoing examples I have described representative embodiments of the principles of my invention. It is to be understood that other alkyl phenols may be made in like manner by appropriate use of the desired phenol and alkyl substituents. It is to be understood that the method of producing the olefine or the alkyl chloride is not limitative of their use in practicing my invention. One convenient source of olefines is that present in cracked petroleum hydrocarbons. It is readily possible to obtain comparatively narrow cuts of unsweetened cracked distillates which are rich in olefines that are suitable for use in practicing my invention. Although the olefines thus obtained consist of a mixture of several members of a homologous series and in most instances several isomeric forms of each homologue, for most purposes the fact that a mixture is produced is immaterial. The alkyl phenols which are utilized in the manufacture of detergents, germicides, phenolaldehyde resins and the like, may, without disadvantage and in some instances with advantage, consist of a mixture. Obviously, if desired, the olefines may be converted into the hydrochlorides and the resulting hydrochlorides caused to react with the phenol. Inasmuch as hydrogen chloride is formed when the alkyl chloride and phenol react, no loss results. Similarly, by following the foregoing procedure one can separate to some extent the alkyl chlorides from the saturated hydrocarbons present in the cracked distillate. However, it is to be noted that the presence of saturated hydrocarbons in the cut of cracked distillate may be tolerated even when the olefine is caused to combine directly with the phenol in the presence of hydrogen chloride.

Under some conditions of cracking a large quantity of di-olefines forms. These may, if desired, be first separated by any well known means as by polymerization, resinification, or advantageously by causing the cracked distillate fraction to react with maleic anhydride. In this way the di-olefines are removed practically quantitatively without affecting the olefine and saturated hydrocarbon content. The halogenated derivatives have high phenol coefficients and are valuable germicides and disinfectants. The higher alkylated phenols, such as those obtained with tertiary amyl, octyl, decyl, duodecyl and higher chlorides form valuable wetting agents when monosulphonated and neutralized to form the sodium or other metallic salts. The method of sulphonation and neutralization is well understood by those skilled in this art.

From the foregoing description of my invention it will be evident to those skilled in the art that I have provided a method of producing alkyl phenols, which are free from aromatic byproducts, including sulphonic acids, ethers and the like. It will likewise be apparent that the invention enables one to obtain an alkyl phenol directly from an olefine having a tertiary olefinic linkage. In general, the reaction proceeds without catalysts such as have been employed heretofore, and while I claim as one feature of my invention the improvement in the manufacture of alkyl phenols wherein an olefine or alkyl chloride is employed that enables one to obviate the use of such reagents as zinc chloride, aluminum chloride, sulphuric acid, acetic acid, phosphoric acid and the like, it is to be understood that the addition of a mere trace of these materials, which in and of itself has little or no effect on the course of the reaction, falls within the spirit of my invention.

What I claim is:

1. The method of alkylating phenols characterized in that an alkyl chloride is first converted into an olefine by splitting HCl from the molecule, after which the olefine is combined with a hydrogen chloride to form an alkyl chloride, and, subsequently, is admixed and reacted with a phenol whereupon hydrogen chloride and the alkyl phenol are formed.

2. The method of alkylating phenols characterized in that an alkyl halide in which the halogen is joined to a member of the group consisting of a primary and secondary carbon atom, which carbon atom is linked directly to a tertiary carbon atom, is caused to react with phenol as such in the absence of a catalyst.

3. The method of alkylating phenols characterized in that an alkyl halide in which the halogen is joined to one of the group consisting of the following: a primary carbon atom and a secondary carbon atom, which carbon atom is linked directly to a tertiary carbon atom, is first converted to an olefine, after which the olefine is combined with a hydrogen halide to form an alkyl halide and which is heated in the absence of catalysts with a phenol as such to reaction temperature whereby hydrogen halide and the alkyl phenol are formed.

4. The method of nuclear alkylation of phenols characterized in that the phenol as such is caused to react in the absence of catalysts and under conditions whereby hydrogen chloride is formed with an alkyl halide which results from the addition of an olefine having a tertiary olefinic linkage and a hydrogen halide.

5. The method of nuclear alkylation of phenols characterized in that the phenol as such is caused to react in the absence of catalysts and under conditions whereby hydrogen chloride is formed with an alkyl halide which, upon splitting hydrogen halide, forms an olefine having a tertiary olefinic linkage, said olefine being capable of combining with hydrogen chloride to form a tertiary alkyl chloride.

6. The method as defined in claim 4 and further characterized in that the alkyl halide is di-isobutyl chloride.

7. The method as defined in claim 4 and further characterized in that the halide is tertiary butyl chloride.

8. The method as defined in claim 4 and further characterized in that the alkyl halide is tertiary amyl chloride.

9. The method of forming tertiary butyl phenol characterized in that di-isobutyl chloride is caused to react with phenol as such at an elevated temperature and in the absence of catalysts.

LUCAS P. KYRIDES.